US008452748B1

(12) United States Patent
Pugh

(10) Patent No.: US 8,452,748 B1
(45) Date of Patent: May 28, 2013

(54) METHOD AND SYSTEM FOR SEARCH ENGINE OPTIMIZATION OF A WEBSITE

(75) Inventor: Jason S. Pugh, Fremont, CA (US)

(73) Assignee: Intuit Inc., Mountain View, CA (US)

( * ) Notice: Subject to any disclaimer, the term of this patent is extended or adjusted under 35 U.S.C. 154(b) by 149 days.

(21) Appl. No.: 13/037,160

(22) Filed: Feb. 28, 2011

(51) Int. Cl.
*G06F 17/30* (2006.01)

(52) U.S. Cl.
USPC .......................................... 707/706

(58) Field of Classification Search
USPC ................................. 707/2, 3, 706
See application file for complete search history.

(56) References Cited

U.S. PATENT DOCUMENTS

| 7,240,028 B1 * | 7/2007 | Rugge .............................. 705/30 |
| 8,082,258 B2 * | 12/2011 | Kumar et al. ................. 707/742 |
| 2003/0055702 A1 * | 3/2003 | Waterston ........................ 705/8 |
| 2007/0094259 A1 * | 4/2007 | Shi ................................... 707/9 |
| 2011/0016104 A1 * | 1/2011 | Leconte ........................ 707/706 |

OTHER PUBLICATIONS

Spydermate.com, "Results for: npcpa.com", http://spydermate.com/output.php? h=9eecab60bf6b23d7523745f1ddb9719d, Dec. 2010, 4 pages.
Top10seotips.com, "Search Engine Optimization Tips", www.top10seatips.com/seo_tips.htm, Dec. 2010, 7 pages.
Woorank.com, "Report for npcpa.com", www.woorank.com/en/www/npcpa.com, Dec. 2010, 4 pages.
Webconfs.com, "Top 10 SEO Mistakes", http://www.webconfs.com/top-10-seo-mistakes-article-24.php, 2005-2006, 4 pages.
Seoworkers.com, "Is your Web Site Optimized for Search Engines", www.seoworkers.com/tools/report.html, Dec. 2010, 17 pages.
Woorank.com, "Report for npcpa.com", www.woorank.com/en/www/ncpca.com, Dec. 2010, 9 pages.
Seoworker.com, "SEO Audit, the most important part of Website Optimization", http://www.seoworkers.com/search-engine-optimization/analysis-services.html, 2010, 3 pages.
Woorank.com, "Woorank Website Analysis Tool", http://blog.woorank.com/archive/1/2010, Jan. 2010, 2 pages.

* cited by examiner

Primary Examiner — Etienne Leroux
(74) Attorney, Agent, or Firm — Osha Liang LLP

(57) ABSTRACT

A method for search engine optimization of a website includes analyzing a website component of the website, making a determination that the website component lacks the search engine optimization, obtaining, from a financial application of a user, a first attribute specific to the user specified by a rule for search engine optimization, generating, using the rule, a suggestion comprising the first attribute based on the determination that the website component lacks search engine optimization, and presenting the suggestion to the user. The method further includes receiving an acceptance of the suggestion from the user, and updating the website component with the suggestion in response to the acceptance.

23 Claims, 7 Drawing Sheets

METHOD AND SYSTEM FOR SEARCH ENGINE OPTIMIZATION OF A WEBSITE

BACKGROUND

The Internet is composed of hundreds of millions of websites. For a consumer of websites, in order to identify new websites or websites relevant to the consumer's interest, the consumer often uses third party sources. One of the most prevalently used third party sources is a search engine. A search engine is a tool that presents a list of web pages to a consumer based on a particular search term or phrase submitted by the consumer.

In general, a search engine has a web crawler, a ranking algorithm, and a user interface. The web crawler is a computer program that visits and gathers information from websites in an automated fashion. Specifically, the function of the web crawler is to obtain information from all websites on the Internet.

When the consumer submits search terms to the search engine, the ranking algorithm and the user interface are used. The ranking algorithm is an algorithm that decides, for a particular set of search terms, the order in which to present websites relevant to the search terms. Typically, the ranking algorithm is based on the relevancy of each web page. The user interface presents a listing of the websites in the order identified by the ranking algorithm. Specifically, for each website in the listing, the user interface presents a portion of the information gathered by the web crawler. For example, the user interface may display the title of the website with a portion of the text gathered from the website.

Websites compete for the consumer's selection of the website in the user interface of the search engine. Whether a consumer selects a particular website can be based on a number of factors, such as the information presented, the rank or position of the particular website in the listing, and the information presented by surrounding websites in the listing. In view of the factors and the automation of the search engine, a website should be optimized for the different components of the search engine. Search engine optimization is a process by which user updates the user's website to compete effectively with other websites for the consumer's selection.

SUMMARY

In general, in one aspect, the invention relates to a method for search engine optimization of a website. The method includes analyzing a website component of the website, making a determination that the website component lacks the search engine optimization, obtaining, from a financial application of a user, a first attribute specific to the user specified by a rule for search engine optimization, generating, using the rule, a suggestion comprising the first attribute based on the determination that the website component lacks search engine optimization, and presenting the suggestion to the user. The method further includes receiving an acceptance of the suggestion from the user, and updating the website component with the suggestion in response to the acceptance.

In general, in one aspect, the invention relates to a system for search engine optimization of a website of a user. The system includes a user data repository for storing a user data catalog comprising attributes obtained from a financial application and specific to the user, a website analysis tool repository for storing a rule for a website component of the website, and a website analysis system operatively connected to the user data repository and the website analysis tool repository. The website analysis system executes on a processor and is configured to analyze, using the rule, the website component, make a determination that the website component lacks the search engine optimization, obtain, from the user data catalog, an attribute of the plurality of attributes based on the attribute being specified by the rule, and generate, using the rule, a suggestion comprising the attribute based on the determination that the website component lacks search engine optimization. The website analysis system is further configured to present the suggestion to the user, receive an acceptance of the suggestion from the user, and update the website component with the suggestion in response to the acceptance.

In general, in one aspect, the invention relates to a computer readable storage medium comprising computer readable program code embodied therein for causing a computer system to perform a method for search engine optimization of a website of a user. The method includes analyzing a website component of the website, making a determination that the website component lacks the search engine optimization, obtaining, from a financial application of a user, a first attribute specific to the user specified by a rule for search engine optimization, generating, using the rule, a suggestion comprising the first attribute based on the determination that the website component lacks search engine optimization, and presenting the suggestion to the user. The method further includes receiving an acceptance of the suggestion from the user, and updating the website component with the suggestion in response to the acceptance.

Other aspects of the invention will be apparent from the following description and the appended claims.

DETAILED DESCRIPTION

Figure 1:
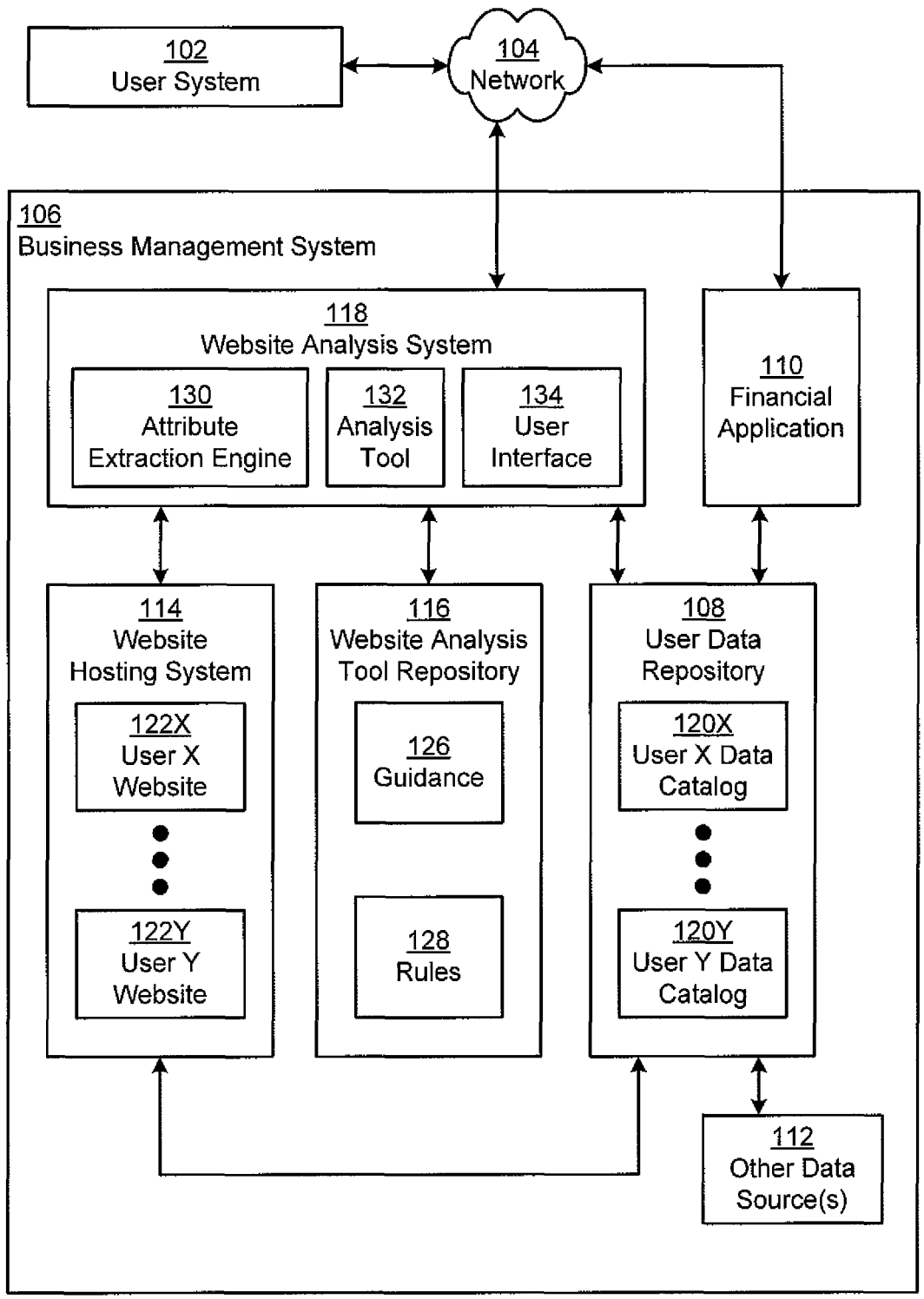
FIGS. 1 and 2 show schematic diagrams of a system in one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for search engine optimization based on information gathered about a user from a financial application. Specifically, embodiments of the invention determine whether a particular component of the website is optimized for the user based on attributes of the user. When the website component is not optimized for the user, embodiments of the invention present a suggestion for the website component that may be used to replace the website component. The suggestion is generated based on the attributes of the user and based on search engine optimization rules.

The user is any individual or group that has a website. Specifically, the user controls the content of the website in one or more embodiments of the invention. The user may be a business entity, such as a merchant, a distributor, a non-profit organization, a family, a partnership, or any other group. Accordingly, the website is any type of website owned by the user. For example, if the user is a merchant, the website may be an e-commerce website for selling products of the merchant. As another example, if the user is a non-profit organization, then the website may be an informational website for providing information about the non-profit organization.

As used herein, a user is deemed to perform an action when an individual, group of individuals, or agent of the user performs an action or receives information on behalf of the user. For example, if the user is a company, the user receives information when the information is presented to a website administrator of the company.

Figure 2:
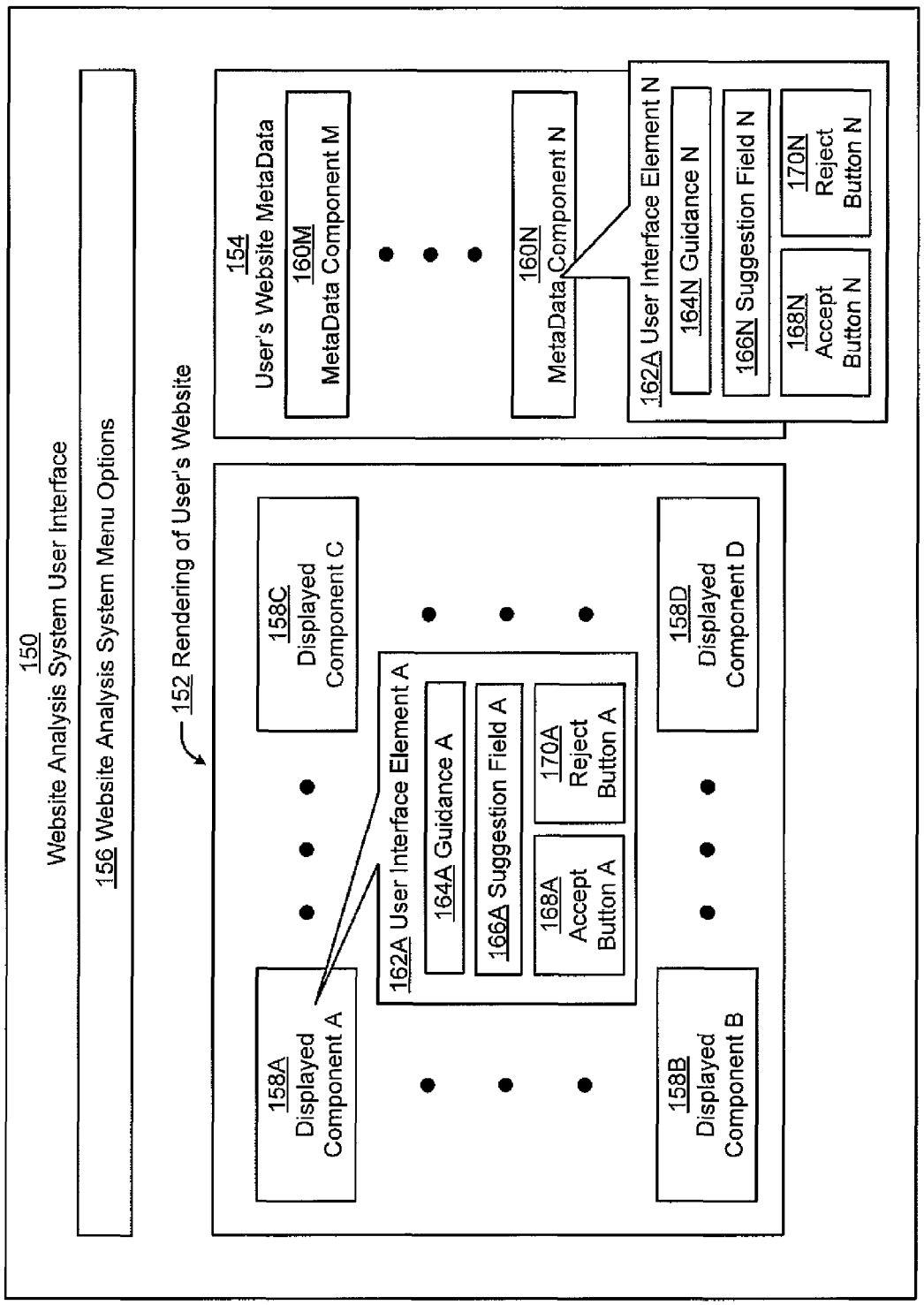

FIGS. 1 and 2 show schematic diagrams of a system in one or more embodiments of the invention. As shown in FIG. 1, the system includes a user system (102), a network (104), and a business management system (106) in one or more embodiments of the invention. Each of these components is discussed below.

Figure 5:
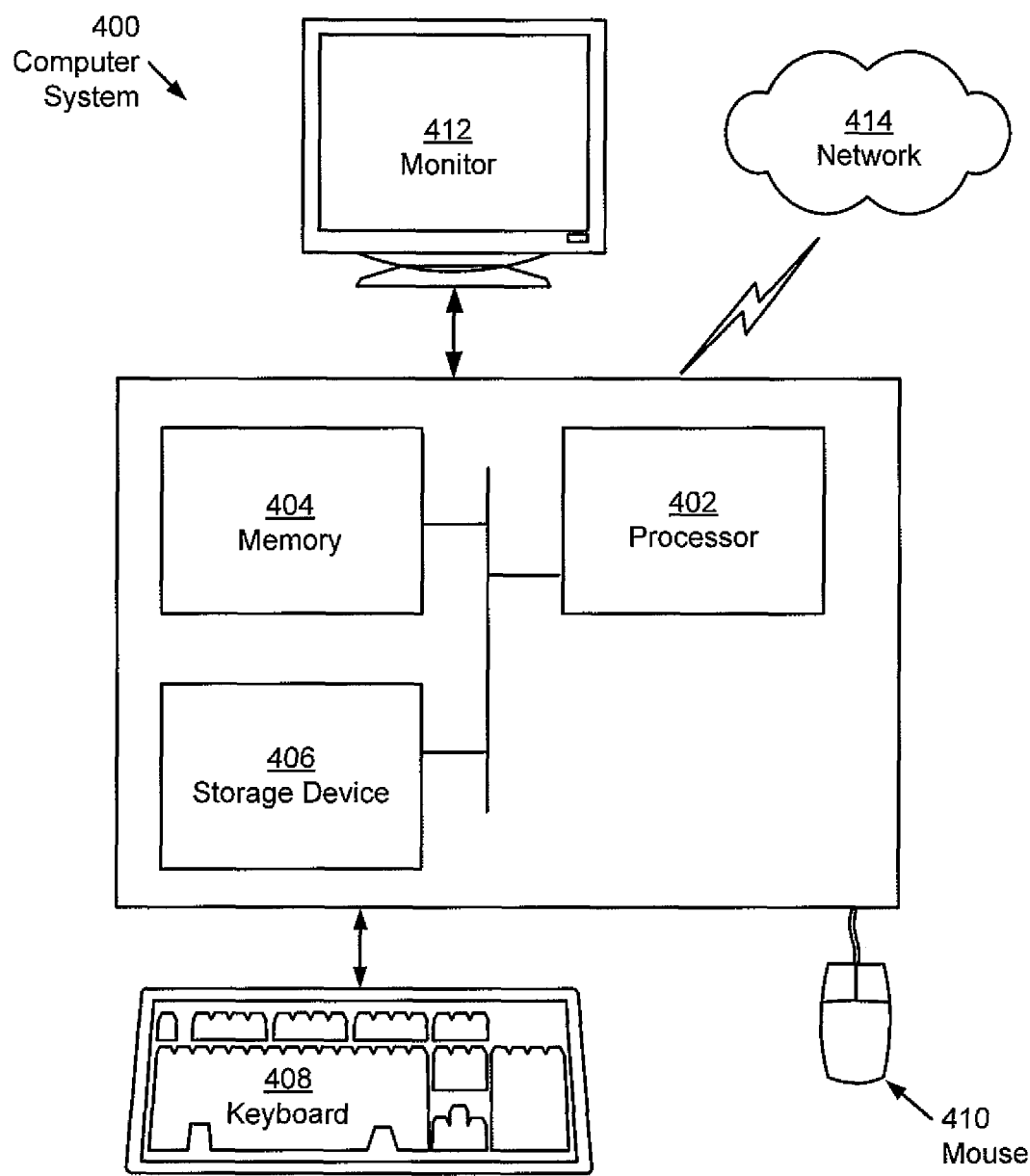
FIG. 5 shows a computer system in accordance with one or more embodiments of the invention.

A user system (102) corresponds to any collection of hardware and/or software used by a user. For example, the user system (102) may include a mobile device (e.g., cellular telephone, laptop computer, smart phone, or any other mobile device), a desktop computer, servers, or any other device or combination of devices. An example of a user system is shown in FIG. 5 and discussed below.

The user system (102) is operatively connected to a network (104). The network (104) is any type of interconnection of computing devices. For example, the network (104) may be a wide area network (e.g., the Internet), a local area network, a mobile network, or any other type of network or combination thereof.

The user system (102) is operatively connected to a business management system (106) in one or more embodiments of the invention. In one or more embodiments of the invention, the business management system is a collection of hardware and/or software components for managing businesses. For example, the business management system (106) may include one or more storage servers, application servers, interconnection devices, and one or more applications. The business management system includes functionality to assist the user in managing different aspects of the user's business. For example, the business management system (106) may include functionality to assist the user in management of the user's finances, creation and management of the user's website, and other management operations.

In one or more embodiments of the invention, the business management system includes a user data repository (108), a financial application (110), other data sources (112), a website hosting system (114), a website analysis tool repository (116), and a website analysis system (118). The business management system (106) may include additional or fewer components without departing from the scope of the invention. Each of the aforementioned components is discussed below.

A user data repository (108) is any type of storage unit and/or device (e.g., a file system, database, collection of tables, or any other storage mechanism) for storing data. Further, the user data repository (108) may include multiple different storage units and/or devices. The multiple different storage units and/or devices may or may not be of the same type or located at the same physical site. In one or more embodiments of the invention, the user data repository (108), or a portion thereof, is secure.

The user data repository (108) includes functionality to store a user data catalog (e.g., user X data catalog (120X), user Y data catalog (120Y)). In one or more embodiments of the invention, each user that uses an application of the business management system has a corresponding user data catalog. The user data catalog includes attributes specific to the user in one or more embodiments of the invention. For example, the attributes in the user data catalog may include the name of the user, trademarks of the user, categories and subcategories of products sold by the user, the number of products sold by the user, the mode used by the user to sell products (e.g., via the Internet, via phone orders, via facsimile, in person, and other modes), administrative information (e.g., contact information for the user, geographic location of the user shops, state of incorporation for the user, and other administrative information), partner companies, interests of the user, and any other information about the user that can be gathered.

The financial application (110) is a software application for assisting the user (102) in management of the user's finances. For example, the financial application (110) may include functionality to perform one or more of the following: inventory management (e.g., recording and ordering inventors), accounting functions (e.g., preparing accounting reports, preparing filings with a governmental or regulatory agency (e.g., tax returns, Securities and Exchange Commission filings, and other filings), financial account management, etc.), employment management (e.g., employee healthcare, payroll, and other employment functions), customer management (e.g., managing orders and information about customers), and other financial tasks.

The financial application (110) includes functionality to gather attributes of the user. The attributes may be gathered while the user is registering the financial application, providing the information to the financial application, or performing other functions of using the financial application. Specifically, in the process of performing financial management functions, the financial application (110) includes functionality to collect data about the user and store the data as attributes in the user data repository (108).

In one or more embodiments of the invention, the attributes are stored for use by the financial application (110) without regards to the use in the website analysis and creation. Specifically, the operations of the website analysis and creation may be independent and transparent to the financial application (110) in one or more embodiments of the invention.

For example, if the financial application (110) includes inventory management functions, then the financial application (110) includes functionality to collect and store attributes of the user's inventory. In the example, the attributes of the inventory may include the categories and sub-categories of each inventory item, the number of each inventory item, the rate at which inventory items are sold, the mode of selling the inventory item (e.g., in person, via the Internet, via facsimile order, or other mode), the customers of the user, and other information.

By way of another example, if the financial application (110) performs accounting functions, the financial application (110) includes functionality to gather administrative information about the user. For example, the administrative information may include the name of the user's business, common names of the user's business, mailing address, business address, and other information. The financial application (110) may store the administrative information in the user data catalog (e.g., user X data catalog (120X), user Y data catalog (120Y)) as attributes of the user.

In addition to the financial application, the business management system (106) may include other data sources (112). The other data sources (112) may include an originator of the data or an interface for the originator of the data.

For example, the originator may be a financial advisor, technical support advisor, a software application advisor, or another advisor employed to support the application(s) of the business management system. For example, the originator may be a customer relationship manager and/or a customer relationship management tool. For example, the advisor may communicate with the user via the phone, instant message, or another communication method, to assist the user with the financial application and/or provide information about the business management system to the user. During the assistance, the user may disclose attributes to the advisor that are specific to the user, such as where the user's customers are primarily located, major products, and other information. Thus, in the process of providing support, the advisor may also collect and store attributes of the user in the user data catalog (e.g., user X data catalog (120X), user Y data catalog (120Y)).

As another example, other data sources (112) may include the user's website. Specifically, attributes of the user may be extracted from the user's website (e.g., user X website (122X), user Y website (122Y)) and stored in the user data catalog in one or more embodiments of the invention. For example, the attributes extracted from the website may include location information, product information, and other attributes.

Continuing with FIG. 1, the website hosting system (114) includes hardware and software for hosting a users' websites (e.g., user X website (122X), user Y website (122Y)). Specifically, the website hosting system (114) provides website hosting services. The website hosting services may include receiving a request for a web page from a consumer of a website and transmitting the web page to the user. The website hosting system (114) may additionally provide database support, e-commerce support, and other features.

Continuing with FIG. 1, the website analysis tool repository (116) is a repository for storing tools to analyze a website. In one or more embodiments of the invention, the website analysis tool repository (116) may be any type of storage unit and/or device (e.g., software library, a file system, database, collection of tables, or any other storage mechanism) for storing tools used for the website analysis. Further, the website analysis tool repository (116) may include multiple different storage units and/or devices. The multiple different storage units and/or devices may or may not be of the same type or located at the same physical site. In one or more embodiments of the invention, the website analysis tool repository (116) may be a part of the website analysis system (118). For example, the website analysis tool repository (116) may be a separate component or an integrated component of an application of the website analysis system (118).

In one or more embodiments of the invention, the website analysis tool repository (116) includes guidance (126) and rules (128). Specifically, each type of website component has one or more corresponding guidance (126) and one or more corresponding rules (128). Both of these components is discussed below.

In one or more embodiments of the invention, guidance (126) provides background information about optimizing the website component. In particular, the guidance (126) may specify how the search engine uses the website component. Further, the guidance (126) may specify ideal characteristics of an optimized website component. For example, the guidance for the Uniform Resource Locator (URL) of a website (e.g., user X website (122X), user Y website (122Y)) may disclose, "Search engines give greater weight to the words in a URL than other words on the web page when ranking pages. Accordingly, the URL should include keywords about the website in order to be ranked higher." In one or more embodiments of the invention, the guidance is generic to multiple users.

Continuing with the website analysis tool repository (116), the rules (128) specify the set of characteristics of a website component that indicates that the website component is optimized. Specifically, the rule (128) defines when to trigger optimization of the website component. If the website component does not comply with the rule (128) corresponding to the website component, then the website component is deemed non-optimized and optimization is triggered.

In one or more embodiments of the invention, the rule (128) may include attribute identifiers for attributes of the user. In one or more embodiments of the invention, the rules (128) may be non-structured with the respect to the order of the attribute identifiers. For example, the rule (128) may specify that as long as attributes corresponding to the specified attribute identifiers are present in the website component, then the website component is optimized.

By way of an example, consider the scenario in which the website component is the keyword meta-tag. In the example, the rule may specify the percentage of categories of the user's products and the products in relation to the total number of categories that should be in the keyword meta-tag. As another example, if the website component is the heading, the rule may specify that the user name should appear in the heading.

In one or more embodiments of the invention, a rule may be used to create a user specific suggestion in one or more embodiments of the invention. For example, consider the scenario in which the rule is used to provide a suggestion for the title tag of the website (e.g., user X website (122X), user Y website (122Y)). The rule may specify that the name of the user should be followed by the goods or services sold by the user which is followed by the geographic location of the user. In the example, if the user is a Los Angeles store called Smith's Surf Shop and sells water sports equipment, the rule may be used to create the title tag: "Smith's Surf Shop, water sports equipment, Los Angeles." In the example, if the user is a Texas store called Buffalo Bill's BBQ House and sells grills, sauces, and barbeque tools, the rule may be used to create the title tag: "Buffalo Bill's BBQ House, grills, sauces, and barbeque tools, Texas." As shown in the example, the rule may be used by the system to generate a user specific suggestion that may be used to update the user's title tag in the user's website.

The website analysis tool repository (116), user data repository (108), and website hosting system (114) are operatively connected to the website analysis system (118). In one or more embodiments of the invention, the website analysis system (118) includes functionality to analyze the user's website (e.g., user X website (122X), user Y website (122Y)) and determine whether the user's website (e.g., user X website (122X), user Y website (122Y)) is optimized for search engines. Specifically, the website analysis system (118) includes functionality to obtain a website component from the user's website (e.g., user X website (122X), user Y website (122Y)) at the website hosting system (114), access the user data catalog (e.g., user X data catalog (120X), user Y data catalog (120Y)) to obtain attributes, and access the website analysis tool repository (116) to obtain guidance (126) and rules (128), and optimize the user's website (e.g., user X website (122X), user Y website (122Y)).

In one or more embodiments of the invention, the website analysis system (118) includes an attribute extraction engine (130), user interface (134), and an analysis tool (132). In one or more embodiments of the invention, the attribute extraction engine (130) includes functionality to extract attributes of the user from the user data catalog (e.g., user X data catalog (120X), user Y data catalog (120Y)). The extraction may include identification of attributes and normalization of the attributes.

With regards to identification of attributes, in one or more embodiments of the invention, at least a portion of the attributes in the user data catalog (e.g., user X data catalog (120X), user Y data catalog (120Y)) are not associated with the attribute identifier. For example, when an advisor stores information about the user, the information may be stored in the form of notes. The attribute extraction engine (130) includes functionality to parse the notes and extract attributes in the notes. By way of another example, the attribute extraction engine (130) may include functionality to perform a screen scrape of documents or images associated with the user. By way of another example, the attribute extraction engine may include functionality to perform a web crawl of the user's website (e.g., user X website (122X), user Y website (122Y)) to identify attributes of the user from the user's website (e.g., user X website (122X), user Y website (122Y)). In alternative embodiments of the invention, each attribute in the user data catalog (e.g., user X data catalog (120X), user Y data catalog (120Y)) and used by the website analysis system is associated with an attribute identifier for the attribute.

With regards to normalization, the attribute extraction engine (130) includes functionality to transform attributes in the user data catalog into a normalized format. For example, the attribute extraction engine (130) may include functionality to change attributes from plural form to singular form, change verbs to present tense, and perform other normalization functions.

The analysis tool (132) includes functionality to analyze the user's website (e.g., user X website (122X), user Y website (122Y)) and determine, based on the extracted attributes of the user, whether the user's website (e.g., user X website (122X), user Y website (122Y)) is optimized for the user. Further, the analysis tool (132) includes functionality to formulate a suggestion to present to the user. In one or more embodiments of the invention, the analysis tool (132) includes functionality to modify the user's website (e.g., user X website (122X), user Y website (122Y)).

The user interface (134) provides the user with an interface to manage the user's website (e.g., user X website (122X), user Y website (122Y)) using the analysis tool (132). Specifically, the user interface (134) includes functionality to present suggestions to the user and receive acceptance, rejection, and/or modification of the suggestions from the user. In one or more embodiments of the invention, the user interface (134) further includes functionality to assist the user in the creation of the user's website (e.g., user X website (122X), user Y website (122Y)). An example of the user interface (134) is discussed below and in FIG. 2.

Continuing with FIG. 1, in one or more embodiments of the invention, the business management system (106) includes functionality to secure the components of the business management system (106). Specifically, entities external to the business management system (106) may be required to be authenticated and have sufficient security authorization to manage and modify users' websites (e.g., user X website (122X), user Y website (122Y)) on the website hosting system (114). For example, using the user's authentication parameters, the user may access and modify the user's website (e.g., user X website (122X), user Y website (122Y)). However, other entities that do not have the security authorization are prohibited from administering the user's website (e.g., user X website (122X), user Y website (122Y)). Similarly, using the same or different authentication parameters, the user may access and modify the user's data catalog (e.g., user X data catalog (120X), user Y data catalog (120Y)) using the financial application (110). However, other entities that do not have the security authorization are prohibited from accessing the user's data catalog (e.g., user X data catalog (120X), user Y data catalog (120Y)). In one or more embodiments of the invention, the level of security may be that applications within the business management system (106) may access and manipulate the users' websites (e.g., user X website (122X), user Y website (122Y)) without requiring additional security credentials.

While FIG. 1 shows a configuration of components, other configurations may be used without departing from the scope of the invention. Specifically, various components of FIG. 1 may be combined such that the functionality of the various components is performed by a single component. Further, the functionality performed by a single component may be performed by two or more components.

For example, although FIG. 1 shows the financial application (110) as located on the business management system (106), the financial application (110) may be located in whole or in part on the user system (102) in one or more embodiments of the invention. Specifically, the financial application (110) may be a lightweight application that is located on a user's mobile device. In such embodiments, the financial application (110) may be configured to transmit information to the user data repository (108) in one or more embodiments of the invention. Other variations of the execution location of the financial application (110) may be used without departing from the scope of the invention.

FIG. 2 shows an example schematic diagram of a website analysis system user interface (150) in one or more embodiments of the invention. As shown in FIG. 2, the example user interface (150) may include a rendering of the user's website (152), and user's website meta-data (154), and menu options (156) in one or more embodiments of the invention.

In one or more embodiments of the invention, the user's website rendering (152) shows a web page of the user's website. Specifically, the user's website rendering (152) is a rendering of what would be displayed to a consumer of the web page when the consumer requests the web page of the user's website in one or more embodiments of the invention. If the user's website includes multiple web pages, then the user's website rendering (152) may include a collection of user's web page renderings. Each web page rendering may be in a separate window or tab of the user interface. Alternatively or additionally, a user may navigate to each rendering as if the user were using the user's website.

In one or more embodiments of the invention, the user's website rendering (152) includes displayed components (e.g., displayed component A (158A), displayed component B (158B), displayed component C (158C), displayed component D (158D)). Displayed components are website components that are displayable to the consumer of the website. Specifically, when a consumer requests a web page for display in the consumer's web browser, the interpreted version of the web page shows the displayed components. In other words, rather than as source code, the displayed components appear as the displayed components would appear to the consumer. The displayed components may correspond to input fields, tables, static and/or dynamic text, menus, embedded multimedia, and other aspects of a web page. Although FIG. 2 shows the displayed components organized in a grid fashion, the displayed components may be organized in any layout.

In one or more embodiments of the invention, the user may manipulate the rendering of the user's website. For example, the user may add or remove displayed components, edit menus, modify displayed components, change the positioning of displayed components, and perform other acts of modification. By manipulating the rendering, the user changes the website.

Although FIG. 2 shows the user's website rendering (152) as having displayed components, the rendering of the user's website may alternatively or additionally include the source code version of the user's website. In such embodiments, the user may manipulate both the displayed components and the source code in one or more embodiments of the invention.

In one or more embodiments of the invention, the user website includes metadata (154). The user interface (150) displays the user's website metadata (154) for viewing by the user. In one or more embodiments of the invention, the user's website metadata includes metadata components (e.g., metadata component M (160M), metadata component N (160N)). A metadata component is data that describes data on the webpage. The metadata component may be hidden from a consumer of a website when the consumer views the interpreted version of the web page Alternatively or additionally, the metadata component may be displayed outside of the webpage on a web browser (e.g., in a title bar, address bar, or other component of the web browser). Specifically, the metadata component corresponds to information about the web page. At least a portion of the metadata components are accessible by a search engine. Specifically, the search engine may use any of the web page components (i.e., displayed components, metadata components) to gather information from the website, rank the website, and display a listing that includes the website. For example, the metadata components may be a title meta-tag that provides a title for website, a keyword meta-tag that includes keywords for the website, the uniform resource locators of the website, information about graphics on the website (e.g., name of graphic, position and size of the graphic, information linked to by the graphic, and other information), and other possible metadata components.

Continuing with the user interface (150), in one or more embodiments of the invention, the menu options (156) show options that are displayed to the user for manipulating the website. For example, the menu options (156) may allow the user to create and edit the website. In one or more embodiments of the invention, the menu options (156) include a search engine optimization option (not shown).

The selection of the search engine optimization option triggers analysis of the user's website in one or more embodiments of the invention. Alternatively or additionally, the search engine optimization option may include configurable parameters, such as frequency to perform search engine optimization analysis, mode to notify the user in the search engine optimization analysis, whether to perform the search engine optimization analysis only when a change is made to the website, and/or other configuration parameters. The user interface (150) may include an interface for allowing a user to modify the configurable parameters.

When the user selects the search engine optimization analysis, the user interface (150) may display user interface elements (e.g., user interface element A (162A), user interface element N (162N)). A user interface element is a component of the user interface (150) that presents information about how a corresponding website component (e.g., displayed component, metadata component) may be optimized for search engines. For example, a user interface element may be a frame, a dialog box, a popup box, a quick-tip, dynamically displayed text, or another type of user interface component. As shown in FIG. 2, the user interface elements may be displayed adjacent to the corresponding website component. As shown in FIG. 2, the user interface element may additionally include an arrow pointing to the corresponding website component.

The user interface element (e.g., user interface element A (162A), user interface element N (162N)) includes guidance (e.g., guidance A (164A), guidance N (164N)), a suggestion field (e.g., suggestion field A (166A), suggestion field N (166N)), an accept button (e.g., accept button A (168A), accept button N (168N)), and a reject button (e.g., reject button A (170A), reject button N (170N)) in one or more embodiments of the invention. As discussed above with reference to FIG. 1, the guidance provides information about the search engine optimization in relation to the corresponding website component. The suggestion field may present a suggestion for updating the corresponding website component. For example, the suggestion may be data to add to or replace the website component or an attribute of the website component. In one or more embodiments of the invention, the suggestion field is editable. In particular, the user may modify the suggestion in the suggestion field to obtain a revised suggestion.

The accept button (e.g., accept button A (168A), accept button N (168N)) correspond to a user interface component for the user to indicate acceptance of the suggestion. The accept button triggers updating of the user interface component. The reject button (e.g., reject button A (170A), reject button N (170N)) correspond to a user interface component for the user to indicate that the user rejects the suggestion. The reject button triggers removal of the user interface element without updating the user interface component. In one or more embodiments of the invention, the website analysis system includes functionality to store which user interface components and which suggestions that the user rejected. In one or more embodiments of the invention, based on the stored information about the rejection, the analysis tool does not present suggestions or the same suggestion for the website component that the user previously rejected.

Although FIG. 2 shows one configuration of user interface components, other configurations of user interface components may be used without departing from the scope of the invention. For example, user interface elements (e.g., user interface element A (162A), user interface element N (162N)) may be displayed in a dialog box, in a menu bar, or in another location. Further, the menu options (156) and user's website metadata (154) may appear in different locations than shown in FIG. 2. Other user interfaces may also be used without departing from the scope of the invention. Furthermore, the website analysis system may include multiple user interfaces for different user system devices. For example, the website analysis system may include one or more mobile device user interfaces and a desktop user interface.

Figure 3:
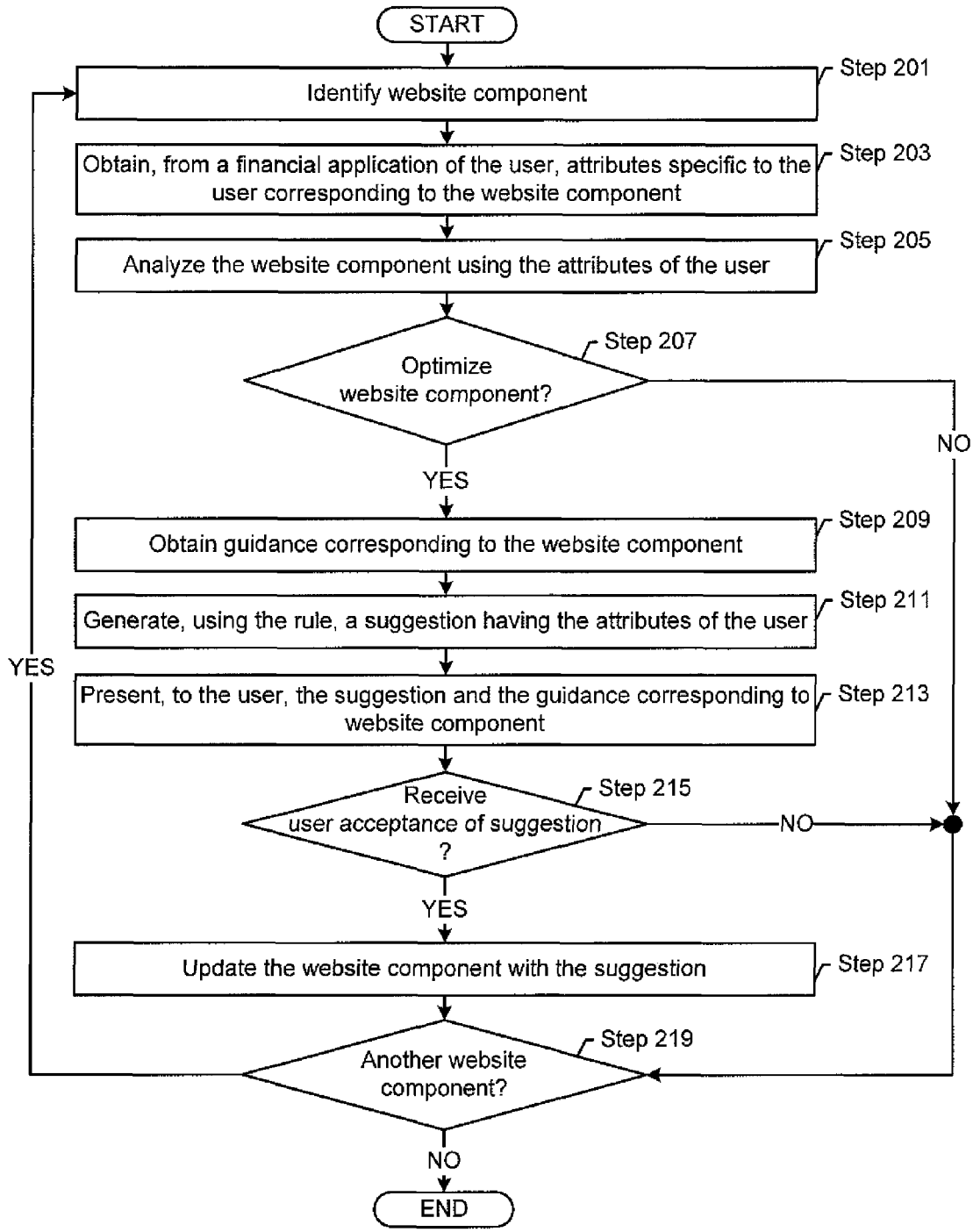
FIG. 3 shows a flowchart in one or more embodiments of the invention.

FIG. 3 shows a flowchart in one or more embodiments of the invention. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that a condition exists in accordance with one or more embodiments of the invention. As another example, determination steps may be performed by performing a verification, such as checking a data value to verify whether the value is consistent with the condition in accordance with one or more embodiments of the invention.

FIG. 3 shows a flowchart for the website analysis system to perform search engine optimization analysis in one or more embodiments of the invention. Various events may trigger the website analysis to perform the search engine optimization analysis in one or more embodiments of the invention. An example event may be that the user selects a menu option requesting the search engine optimization analysis. The selection may be performed while the user is creating or modifying the user's website using a website creating tool, while the user is configuring the web hosting system to host the website using an interface to the web hosting system, or at another time.

As part of selecting the menu option, the user interface may present a submenu to the user that allows the user to select configuration parameters. For example, the configuration parameters may include types of website components to analyze during search engine optimization (e.g., headers, metadata, keywords, uniform resource locators, and other types of website components), when to perform the analysis, the appearance and positioning of the user interface element, whether to automatically accept suggestions without further submission by the user, and any other configuration parameters.

Continuing with example events to trigger the analysis of the user's website, the event may be temporal based. Specifically, the website analysis system may be configured to perform the search engine optimization analysis at a pre-defined frequency (e.g., every day, every month, every six weeks, every six months, etc.). The website analysis system may further be configured with configuration parameters, such as the configuration parameters discussed above. The configuration parameters may further include a mode by which the user is to be notified when the website analysis system identifies one or more website components that can be optimized.

Another example event to trigger the analysis of the user's website may be changed based. Specifically, a change to at least one of the files of the user's website may trigger the website analysis system to perform the search engine optimization analysis. The website analysis system may further be configured with configuration parameters, such as the configuration parameters discussed above. Additional configuration parameters may be included without departing from the scope of the invention.

The above are only a few of the events that may trigger the website analysis system to perform the search engine optimization analysis. Other events and/or a combination of events may trigger the website analysis system to perform the search engine optimization analysis.

When the search engine optimization analysis is triggered, the website analysis system may identify and analyze each website component. Specifically, in Step 201, a website component is identified. The identified website component may be a displayed component or a metadata component of the user's website.

In Step 203, attributes specific to the user and corresponding to the website component are obtained from a financial application of the user. Specifically, the financial application may directly or indirectly provide the attributes of the user to the website analysis system. For example, the attributes may be provided via an application programming interface of the financial application. By way of another example, the attributes may be provided indirectly, such as by way of a user data catalog stored at the user data repository. In such embodiments, the attribute extraction engine may extract the attributes in a format required by the website analysis system. Although not shown in FIG. 3, attributes specific to the user may be obtained from other sources and stored in the user data catalog. Thus, the attributes from the other source may be used to analyze the website component and generate a suggestion in one or more embodiments of the invention.

In Step 205, the website analysis system analyzes the website component using the attributes of the user in one or more embodiments of the invention. Specifically, the analysis determines whether the website component is optimized for the user.

In one or more embodiments of the invention, Steps 203 and 205 may be performed using rules. Each rule may identify the website component, identify an attribute of the website component (e.g., name, value, size, associated tags, and other attributes), identify relevant attributes specific to the user, and define a relationship between the attribute of the website component and the attributes specific to the user. The website analysis system may determine whether the website component conforms to the requirements of the rule.

For example, consider the scenario in which the website component is keywords metadata. The rule may identify the value of the keywords metadata (i.e., which keywords are included the keywords metadata of the website), the categories and product names of products sold by the user, the geographic location of the user, and the relationship between the value of the keywords metadata and the attributes of the user. In the example, the relationship may be that each category, product name, and the geographic location of the user must be included in the value of the keywords metadata. Alternatively, the relationship may be that if at least 95% of each category, product name, and the geographic location of the user is included in the value of the keywords metadata, then the keywords metadata complies with the rule.

By way of another example, consider the scenario in which the website component is the user's logo as an image. The rule may identify the alt attribute for the user's logo, the company name of the user, and the relationship that the company name must be included in the alt attribute of the image in order for the website component to be optimized for search engines.

By way of another example, consider the scenario in which the website component is a site map. The rule may identify that the site map must match the layout of the user's website.

In one or more embodiments of the invention, multiple rules may be associated with a single website component. In such embodiments, the website analysis system may iterate through each rule to determine whether the website component complies with the rule. Thus, the website may perform the steps of FIG. 3 for each rule corresponding to each website component of the user's website.

In Step 207, a determination is made whether to optimize the website component. Specifically, the results of the analysis of Step 205 are checked to determine whether the website component is already optimized for the user. If the website component is already optimized for the user, then the method proceeds to checking the next website component in Step 219. If the website component lacks search engine optimization, then the method proceeds to Step 209 to optimize the website component.

In Step 209, guidance corresponding to the website component is obtained. In one or more embodiments of the invention, the guidance that is obtained is specific to the particular attribute of the website component identified in the rule with which the website component does not comply. For example, if the website component does not comply with the rule corresponding to the alt attribute, then the obtained guidance corresponds to the alt attribute of the website component. By way of another example, if the website component does not comply with a rule corresponding to the value attribute, then the obtained guidance corresponds to the value attribute of the website component.

In one or more embodiments of the invention, each rule may include a unique identifier of the guidance. Thus, to obtain the guidance, the rule with which the website component does not comply is accessed to obtain the unique identifier. The website analysis tool repository may be searched for the guidance corresponding to the unique identifier.

In Step 211, a suggestion having attributes specific to the user is generated using the rule. Specifically, the rule may specify the order of attributes and which attributes to include in the website component. Based on the rule, the corresponding attributes specific to the user are obtained. The corresponding attributes may include one or more of the previously obtained attributes and/or newly obtained attributes from the user data catalog. The corresponding attributes may be ordered according to the rule. Additionally, the rule may specify delimiters to add between attributes. The result of obtaining the attributes and ordering the attributes is the creation of a user specific suggestion for modifying the website component.

In Step 213, the suggestion and the guidance corresponding to the website component is presented to the user in one or more embodiments of the invention. In one or more embodiments of the invention, presenting the suggestion and the guidance may include appending the suggestion and the guidance to an email or other electronic communication to the user, displaying a user interface element with the suggestion and the guidance, or performing another act for allowing the user to view the suggestion and the guidance.

Although not shown in FIG. 3, when the user reviews the suggestion, the user may amend the suggestion with revised text. For example, the user may change the attributes, the static text, or the displayed format of the suggestion. When the user provides revised text, the suggestion is amended accordingly.

In Step 215, a determination is made whether user acceptance of the suggestion in received in one or more embodiments of the invention. If user acceptance of the suggestion is received, then the website component is updated with the suggestion in Step 217. Specifically, the suggestion replaces the attribute of the website component in one or more embodiments of the invention. If the user acceptance of the suggestion is not received, then the suggestion may be rejected and the method may proceed to Step 219.

Continuing with FIG. 3, a determination is made whether another website component exists in Step 219. Specifically, the determination is made whether another website component that has not been analyzed exists. If another website component exists, then the method repeats in Step 201 with the next website component. If another website component does not exist, then the method may end and the website is deemed optimized for search engines.

Figure 4A:
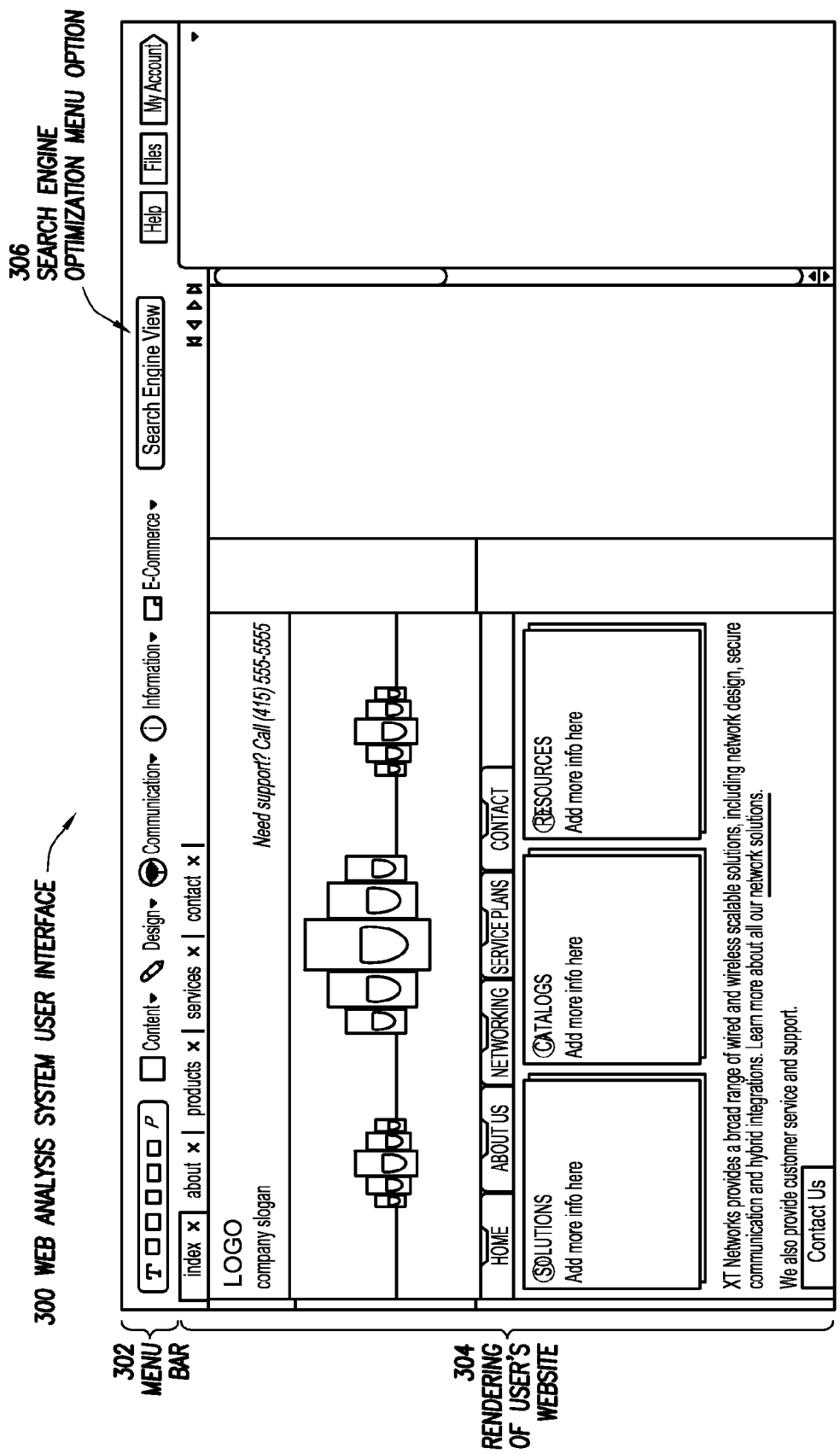
FIGS. 4A-4C show an example in one or more embodiments of the invention.
Figure 4B:
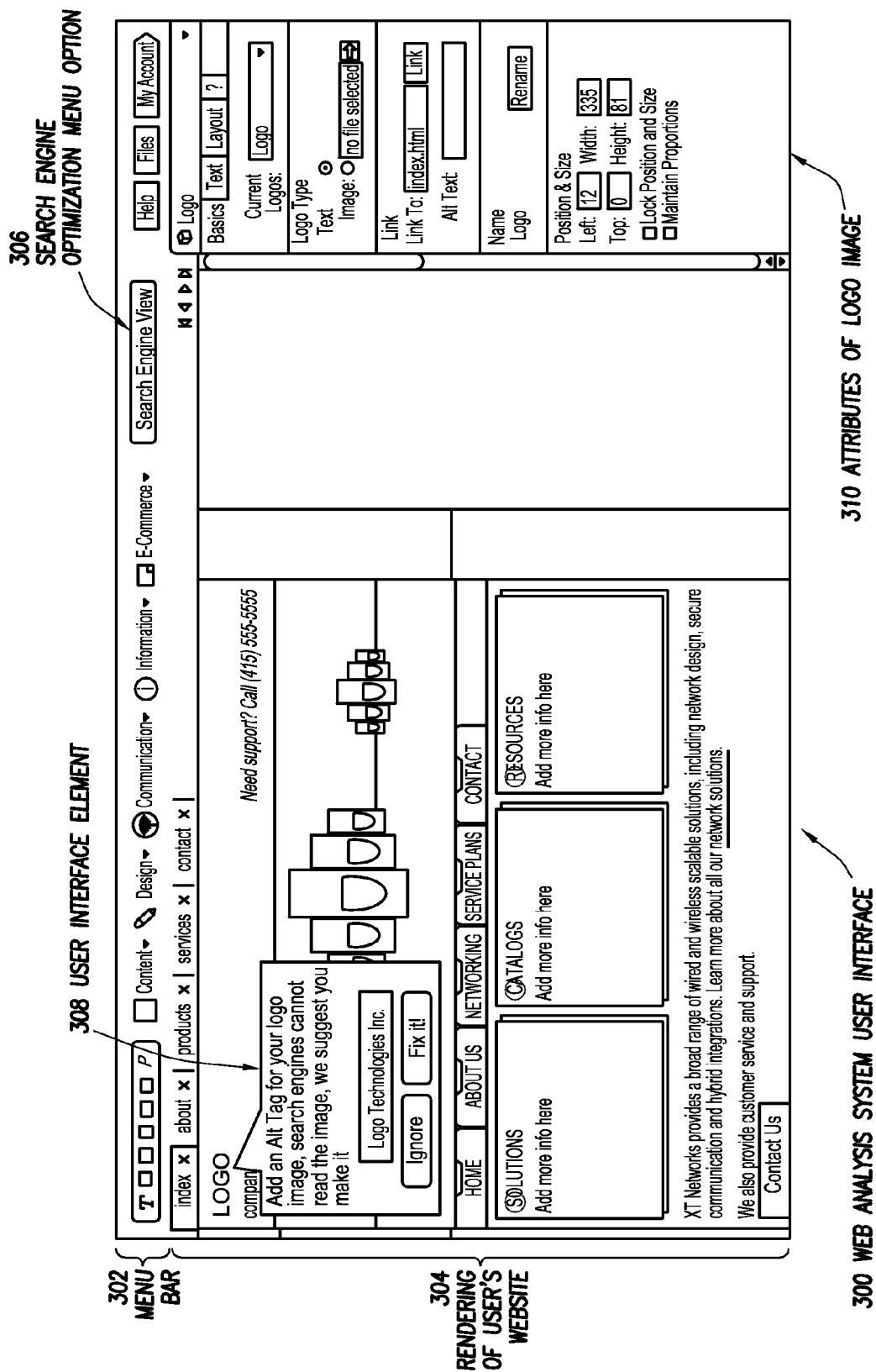
Figure 4C:
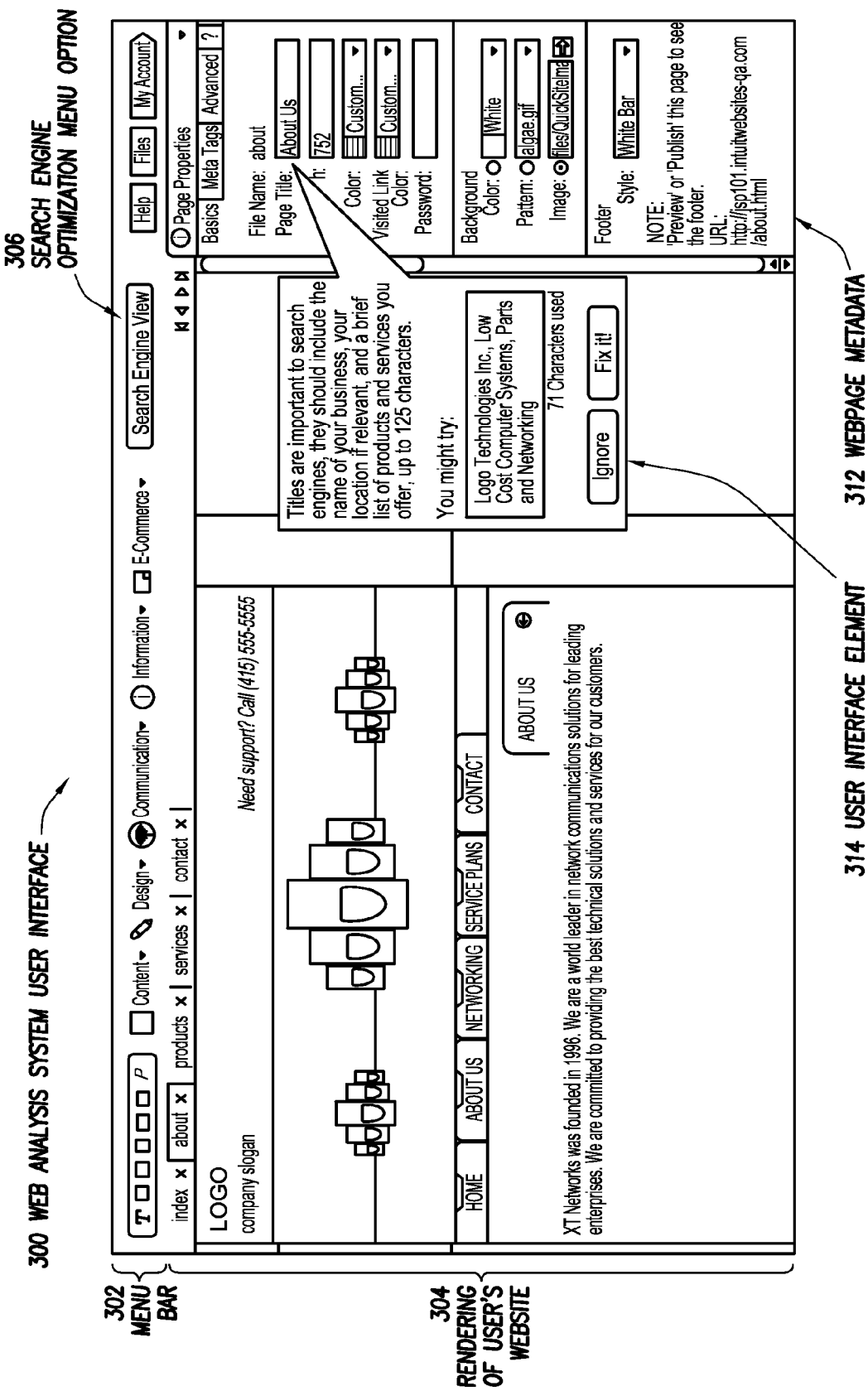

FIGS. 4A-4C show example user interfaces in one or more embodiments of the invention. The following example is for explanatory purposes only and not intended to limit the scope of the invention.

In the example, consider the scenario where a company Logo Technologies is creating a website for selling Logo Technologies technological products. FIG. 4A shows an example of the website analysis system user interface (300). As shown in FIG. 4A, the user interface (300) includes a menu bar (302) and a rendering of the user's website (304) in one or more embodiments of the invention. When the user is ready, the user may select the search engine optimization menu option (306) to have the website analyzed to account for how the search engine would view the website.

Continuing with the example, FIG. 4B shows a schematic diagram of the website analysis system user interface (300) with a user interface element (308) showing a suggestion. As shown in FIG. 4B, the user interface element (308) includes guidance stating "Add an Alt Tag for your logo image. Search engines cannot read the image." Thus, the guidance provides information to the user about how the search engine would use the website component and a general statement about what should be in the website component. In the scenario shown, the guidance states that the search engine is incapable of reading an image and, therefore, would ignore the image.

Additionally, the user interface element (308) includes a suggestion of "Logo Technologies, Inc." for the Alt tag. The suggestion uses information gathered about the user from a financial application of the user. Thus, even though the formal name of Logo Technologies may not appear on the website, the website analysis system is able to provide a user specific suggestion that includes the full name of the user's business. The user may modify the suggestion, "Logo Technologies, Inc.", with revised text to change the suggestion.

As shown in FIG. 4B, the website analysis system user interface (300) may further show attributes of the website component (310) to which the user interface element (308) applies. Specifically, as shown in FIG. 4B, the attributes of the Logo Image are displayed. Thus, the user may view all of the attributes of the website component before determining whether to accept or reject the suggestion in one or more embodiments of the invention.

If the user selects the accept button (labeled "Fix-it!") to accept the suggestion, then the website component is updated to have an Alt tag of "Logo Technologies, Inc." If the user selects the reject button (labeled "Ignore") to reject the suggestion, then the website analysis system continues the analysis with the next website component.

Continuing with the example, the website analysis system may additionally analyze the website metadata. FIG. 4C shows a schematic diagram of the website analysis system user interface (300) with a user interface element (314) showing a suggestion for a particular web page of the user's website. In FIG. 4C, the website analysis system identifies that the web page metadata (312) for one of the web pages of the user's website lacks search engine optimization. Accordingly, the user interface element (314) is displayed. The user interface element (314) includes guidance stating "Titles are important to search engines, they should include the name of your business, your location if relevant, and a brief list of products and services you offer, up to 125 characters." Additionally, the user interface element (314) includes a suggestion of "Logo Technologies, Inc, Low Cost Computing Systems, Parts, and Networking" for the Title. The suggestion uses information gathered about the user from a financial application of the user. Thus, even though the various attributes of the suggestion are not in the website and may not be gathered from the website, the attributes specific to the user from the financial application may be used to provide a suggestion that is specific to the user.

If the user selects the accept button (labeled "Fix-it!") to accept the suggestion, then the website component is updated to have a page title of "Logo Technologies, Inc, Low Cost Computing Systems, Parts, and Networking." If the user selects the reject button (labeled "Ignore") to reject the suggestion, then the website analysis system continues the analysis with the next website component.

In one or more embodiments of the invention, after the user has accepted suggestions, the user's website is optimized for search engines. Through the process of the user accepting suggestions for the search engine optimization, the user's website is modified without requiring the user to manually determine how to best optimize the website components.

Embodiments of the invention may be implemented on virtually any type of computer regardless of the platform being used. For example, as shown in FIG. 5, a computer system (400) includes one or more processor(s) (402) such as an integrated circuit, central processing unit, or other hardware processor, associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer system (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., website hosting system, website analysis system, financial application, user system, analysis tool, attribute extraction engine, etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions to perform embodiments of the invention may be stored on a non-transitory computer readable storage medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for search engine optimization of a website, comprising:
    analyzing a website component of the website;
    making a determination that the website component lacks the search engine optimization;
    obtaining, from a financial application of a user, a first attribute specific to the user specified by a rule for search engine optimization;
    generating an optimized website component, wherein the optimized website component is optimized according to the rule, and comprises the first attribute specific to the user;
    generating a suggestion for the search engine optimization, wherein the suggestion comprises replacing the website component with the optimized website component;
    presenting the suggestion to the user;
    receiving an acceptance of the suggestion from the user; and
    replacing the website component with the optimized website component in response to the acceptance.

2. The method of claim 1, further comprising:
    obtaining guidance corresponding to the website component, wherein the guidance describes how a search engine uses the website component; and
    presenting the guidance with the suggestion.

3. The method of claim 1, wherein presenting the suggestion comprises:
    creating a user interface element comprising the suggestion and an acceptance button; and
    displaying the user interface element adjacent to the website component on the website.

4. The method of claim 3, further comprising:
    receiving, from the user in the user interface element, revised text for the suggestion; and
    revising the suggestion with the revised text.

5. The method of claim 1, wherein analyzing the website component comprises:
    determining that the website component lacks the search engine optimization based on the website component failing to comprise the first attribute.

6. The method of claim 1, further comprising:
    gathering a plurality of attributes about the user while the user is using the financial application, wherein the plurality of attributes comprises the first attribute; and
    storing the plurality of attributes in a user data catalog.

7. The method of claim 1, wherein the analyzing the website component is performed based on a schedule, and wherein presenting the suggestion comprises sending a notification to the user with the suggestion.

8. The method of claim 1, further comprising:
    detecting a modification of the website after the website is deployed, wherein the analyzing the website component is triggered by the modification.

9. The method of claim 1, further comprising:
    performing a web crawl of the website to obtain a second attribute specific to the user, wherein the suggestion is generated with the second attribute.

10. The method of claim 1, further comprising:
    obtaining, from a customer relationship management tool, a second attribute gathered by direct communication with the user, wherein the suggestion is generated with the second attribute.

11. A system for search engine optimization of a website of a user, the system comprising:
    a user data repository for storing a user data catalog comprising a plurality of attributes obtained from a financial application and specific to the user;
    a website analysis tool repository for storing a rule for a website component of the website; and a website analysis system operatively connected to the user data repository and the website analysis tool repository, wherein the website analysis system executes on a processor and is configured to:

analyze, using the rule, the website component;

make a determination that the website component lacks the search engine optimization;

obtain, from the user data catalog, an attribute of the plurality of attributes based on the attribute being specified by the rule;

generate an optimized website component, wherein the optimized website component is optimized according to the rule, and comprises the attribute specific to the user;

generate a suggestion for the search engine optimization, wherein the suggestion comprises replacing the website component with the optimized website component;

present the suggestion to the user;

receive an acceptance of the suggestion from the user; and replace the website component with the optimized website component in response to the acceptance.

12. The system of claim 11, wherein the website analysis tool repository further stores:

guidance corresponding to the website component, wherein the guidance describes how a search engine uses the website component, and wherein the guidance is presented with the suggestion.

13. The system of claim 11, wherein the website analysis system comprises:

a user interface comprising:

a user interface element comprising the suggestion and an acceptance button, wherein the user interface element is displayed adjacent to the website component on the website, wherein the suggestion is presented by updating the user interface to display the user interface element.

14. The system of claim 11, wherein the financial application is configured to:

gather the plurality of attributes about the user while the user is using the financial application; and store the plurality of attributes in the user data catalog.

15. The system of claim 11, further comprising:

a web hosting system for hosting the website, wherein the web hosting system is configured to:

detect a modification of the website after the website is deployed, wherein the analyzing the website component is triggered by the modification.

16. A computer readable storage medium comprising computer readable program code embodied therein for causing a computer system to perform a method for search engine optimization of a website of a user, the method comprising:

analyzing a website component of the website;

making a determination that the website component lacks the search engine optimization;

obtaining, from a financial application of a user, an attribute specific to the user specified by a rule for search engine optimization;

generating an optimized website component, wherein the optimized website component is optimized according to the rule, and comprises the attribute specific to the user;

generating a suggestion for the search engine optimization, wherein the suggestion comprises replacing the website component with the optimized website component;

presenting the suggestion to the user;

receiving an acceptance of the suggestion from the user; and replacing the website component with the optimized website component in response to the acceptance.

17. The computer readable storage medium of claim 16, wherein the method further comprises:

obtaining guidance corresponding to the website component, wherein the guidance describes how a search engine uses the website component; and presenting the guidance with the suggestion.

18. The computer readable storage medium of claim 16, wherein presenting the suggestion comprises:

creating a user interface element comprising the suggestion and an acceptance button; and displaying the user interface element adjacent to the website component on the website.

19. The computer readable storage medium of claim 18, wherein the method further comprises:

receiving, from the user in the user interface element, revised text for the suggestion; and revising the suggestion with the revised text.

20. The computer readable storage medium of claim 16, wherein analyzing the website component comprises:

determining that the website component lacks the search engine optimization based on the website component failing to comprise the attribute.

21. The computer readable storage medium of claim 16, wherein the method further comprises:

gathering a plurality of attributes about the user while the user is using the financial application, wherein the plurality of attributes comprises the attribute; and storing the plurality of attributes in a user data catalog.

22. The computer readable storage medium of claim 16, wherein the analyzing the website component is performed based on a schedule, and wherein presenting the suggestion comprises sending a notification to the user with the suggestion.

23. The computer readable storage medium of claim 16, wherein the method further comprises:

detecting a modification of the website after the website is deployed, wherein the analyzing the website component is triggered by the modification.

* * * * *